United States Patent

[11] 3,614,522

[72] Inventors Michael J. Halinski
 Arlington Heights;
 Larry Wanschek, Chicago, both of Ill.
[21] Appl. No. 801,526
[22] Filed Feb. 24, 1969
[45] Patented Oct. 19, 1971
[73] Assignee Sun Electric Corporation

[54] CIRCUIT FOR AUTOMATICALLY SELECTING ONE OF TWO SYNCHRONIZING PULSE SOURCES
4 Claims, 2 Drawing Figs.

[52] U.S. Cl. .................................................. 315/26,
 307/234, 307/269, 328/120, 331/49
[51] Int. Cl. ........................................................ H01j 29/70
[50] Field of Search............................................ 315/19, 25,
 26; 307/234, 269; 328/120; 331/49

[56] References Cited
UNITED STATES PATENTS
3,289,097 11/1966 Martin........................... 307/269 X
3,253,157 5/1966 Lemon .......................... 307/234

OTHER REFERENCES
Boggs et al., Timing Ckts., IBM Tech. Discl., Vol. 9 No. 12, May 1967, p. 1795

Primary Examiner—Rodney D. Bennett, Jr.
Assistant Examiner—Joseph G. Baxter
Attorney—Bair, Freeman & Molinare ABSTRACT: A signal control circuit for applying a synchronizing signal to an oscilloscope circuit from a local frequency generator whenever an external source of triggering signals is unavailable, disabled or inadvertently disconnected. When available, the external triggering signal is applied both to the synchronizing input of the conventional scope circuitry and to the gate electrode of a silicon-controlled rectifier which maintains a capacitor in a discharged state. Whenever the voltage across this capacitor rises due to a loss of external triggering signals, a transistor-switching circuit applies voltage through a variable resistance to a timing capacitor, in turn, causing a unijunction transistor to "fire" periodically in delayed phase synchronism with a local signal generator, thereby producing a secondary source of pulses which are automatically applied to the oscilloscope.

INVENTORS
MICHAEL J. HALINSKI
& LARRY WANSCHEK

ATTORNEYS

CIRCUIT FOR AUTOMATICALLY SELECTING ONE OF TWO SYNCHRONIZING PULSE SOURCES

BACKGROUND OF THE INVENTION

Electronic automotive test equipment is normally used by mechanics who are unskilled in electronics. It is therefore desirable that the operation and control of such test equipment be automated as much as possible so that optimum results are more conveniently achieved.

The task of properly synchronizing an oscilloscope used in the testing of automotive ignition systems is a typical example. Although the most understandable oscilloscope display is obtained when the horizontal sweep of the oscilloscope is synchronized to the waveform being monitored, such synchronization requires that an electrical connection be established between the "sync" input of the oscilloscope and an appropriate source of external triggering signals. The automotive technician may well make such a connection incorrectly —or fail to make it at all. The relatively slow, untriggered, free-running sweep which then occurs accordingly produces a display which is difficult to evaluate by the technician. Moreover, such a slow sweep rate tends to cause excessive heating of the deflection amplifiers in oscilloscopes having electromagnetic deflection. The longer current draw time greatly increases the average power input dissipated by the sweep amplifiers and may cause amplifier failure.

SUMMARY OF THE INVENTION

It is accordingly a principal object of the present invention to automatically supply a sweep frequency synchronizing signal to an oscilloscope whenever the source of external triggering signals is disconnected or disabled.

It is a further object of the invention to ensure that the frequency of the applied synchronizing signal is at all times greater than a predetermined value such that excessive heating of the deflection amplifiers in the oscilloscope is prevented.

In accordance with a principal feature of the present invention, the external synchronizing signal (when available) is applied to the gate electrode of the silicon-controlled rectifier, causing that rectifier to periodically discharge a capacitor. Should the charge across this capacitor accumulate by an inordinate amount, switching means are employed to apply a charging current to a second capacitor through a variable resistance. The accumulated voltage across this second capacitor periodically "fires" an unijunction transistor whose interbase path is connected between a local signal generator and the oscilloscope synchronizing circuit. Each time the unijunction transistor fires discharging the second capacitor, a synchronizing pulse is delivered to the oscilloscope, this signal being phase delayed and locked in frequency synchronism with the local signal generator.

BRIEF DESCRIPTION OF THE DRAWINGS

These and other objects, features and advantages of the present invention will be more clearly understood through a consideration of the following detailed description. In the course of this description, reference will frequently be made to the attached drawings in which.

DESCRIPTION OF THE PREFERRED EMBODIMENT

Figure 1:
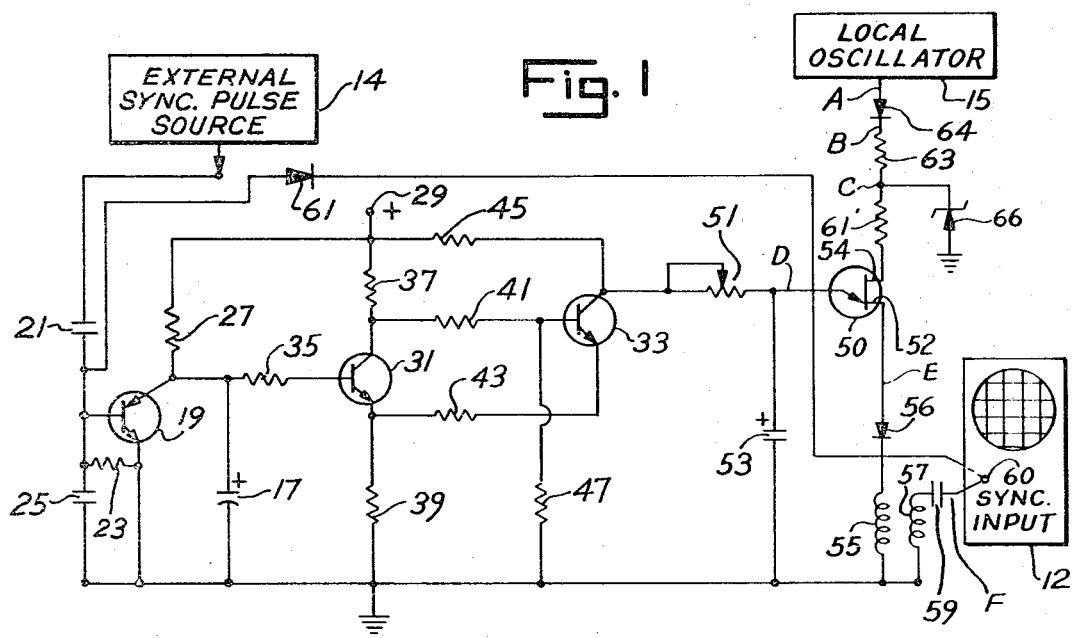
FIG. 1 is a schematic drawing of a signal control circuit embodying the principles of the present invention.

The control circuit shown schematically in FIG. 1 insures the continued application of synchronizing pulses to the oscilloscope 12. Normally, synchronizing pulses which are applied to oscilloscope 12 are obtained from an external pulse source 14; however, should the pulse source 14 be disconnected or disabled, the control circuit contemplated by this invention instead supplies a series of triggering pulses which are phase delayed with respect to (but in synchronism with) the local oscillator 15.

The presence (or absence) of external triggering signals is detected by a circuit which includes a combination of capacitor 17 and PNPN silicon-controlled rectifier 19. Pulses from the external source 14 are normally applied through a capacitor 21 to the gate terminal of the "SCR" 19. The parallel combination of resistor 23 and capacitor 25 is connected between the gate terminal of SCR 19 and ground and is employed as a gate input filter for SCR 19. The anode-cathode (or transconductive) path of SCR 19 is connected in series with a resistor 27 between a positive voltage supply terminal 29 and ground. Capacitor 17 is connected in parallel with the SCR 19.

Pulses from the external source 14 are applied to the SCR 19, periodically gating that device into conduction and maintaining the charge across capacitor 17 at a low level. Each time the SCR 19 "fires" the capacitor 17 discharges therethrough until the discharge current (in combination with the low-level current flowing through resistor 27) drops below that value necessary to keep SCR 19 in an "ON" condition. At this point, SCR 19 becomes nonconductive and the capacitor 17 again begins to charge at a relatively slow rate. So long as pulses of adequately high frequency are applied from the external source 14, the accumulated charge on capacitor 17 is consistently held to a low level. Should the external source 14 become disabled, disconnected, or drop to a low pulse repetition rate, however, the voltage across capacitor 17 rises substantially.

Any loss of the external synchronizing pulse signal from source 14 is thus manifested as an increase in the voltage across capacitor 17. This voltage rise operates a semiconductor switching circuit made up of transistors 31 and 33. A resistor 35 connects the base of transistor 31 to the positive terminal of capacitor 17. Resistor 37 connects the collector of transistor 31 to the positive supply terminal 29 while resistor 39 connects the emitter of that transistor to ground. Transistor 31 is normally maintained nonconductive by the low voltage appearing across capacitor 17 (as will be noted, the voltage at the emitter of transistor 31 is held at a relatively high level through the current flowing from transistor 33 through resistor 39).

The base of transistor 33 is connected to the collector of transistor 31 by means of a resistor 41 while its emitter is connected to the emitter of transistor 31 via resistor 43. The collector of transistor 33 is connected to the positive supply terminal 29 by means of a collector-resistor 45. Resistor 47, which is connected between the base of transistor 33 and ground, completes a biasing circuit for transistor 33. This biasing circuit normally supplies a positive voltage to the base of transistor 33 adequate to keep that transistor in a conductive state. When the voltage across capacitor 17 reaches a predetermined value, however, the transistor 31 is switched into conduction, simultaneously increasing the emitter potential and decreasing the base potential of transistor 33, turning that transistor off. The amount of "hysteresis" exhibited by the switching circuit made up of transistors 31 and 33 may be varied by adjusting the magnitude of resistor 43.

As will be appreciated from the foregoing, transistors 31 and 33 and their associated circuitry operate to provide positive, regenerative switching action in response to an increase in the voltage across capacitor 17 above a predetermined value. The actuation of this regenerative switching device results in an abrupt increase in the voltage appearing at the collector of transistor 33. As will be discussed below, the voltage appearing at the collector of transistor 33 is, in turn, employed to operate a frequency-locked, phase-delayed pulse signal generator in which unijunction transistor 50 is the active element.

The voltage appearing at the collector of transistor 33 is supplied to the emitter terminal of unijunction device 50 through a variable resistance 51. A capacitor 53 is connected between the emitter of unijunction transistor 50 and ground.

The base-one terminal 52 of transistor 50 is connected to one terminal of the primary winding 55 of a step-up transformer, the other terminal of primary winding 55 being grounded. A diode 56 is connected in series with winding 55 in order to eliminate excessive voltages at base-one terminal 52. The primary winding 55 is inductively coupled to a secondary winding 57 which is connected in series with a coupling capacitor 59 between ground and the synchronizing input terminal 60 of the oscilloscope 12. A diode 61 is employed to connect the input terminal 60 to the output-coupling capacitor 21 from the external synchronizing source 14. As will be more clearly understood from the description to follow, the diode 61 is employed to prevent synchronizing pulses developed across secondary winding 57 from feeding back and firing the silicon-controlled rectifier 19, thereby giving an erroneous indication that external synchronizing pulses are present.

The base-two terminal 54 of transistor 50 is connected through the series combination of resistors 61' and 63 and diode 64 to the output of the local oscillator 15. The diode 64 passes only positive-going pulses through the resistors 63 and 61' to the base-two terminal of transistor 50. A Zener diode 66 is connected between ground and the junction of resistors 61' and 63 and serves to "clip" voltage peaks from the waveform obtained from local oscillator 15.

Current pulses are applied to the primary winding 55 only when a voltage from the local oscillator 15 is applied to the base-two terminal of transistor 50 and the voltage across capacitor 53 has built up to a value equal to the intrinsic "standoff" voltage necessary to fire the unijunction device 50. When unijunction device 50 is switched into conduction, a pulse of current from capacitor 53 is applied through the primary winding 55 to produce a synchronizing pulse signal across secondary winding 57. This pulse occurs after a delay interval following the initiation of a positive-going signal from local oscillator 15, the duration of the delay interval being dependent upon the magnitude of resistance exhibited by potentiometer 51. The pulses produced across secondary winding 57 are thus in synchronization with and phase delayed from the waveform from local oscillator 15.

The circuit shown in FIG. 1 of the drawings serves to prevent excessive heating of the deflection amplifiers in an oscilloscope employing electromagnetic deflection. Excessive heating is prevented by providing a constant sweep trace to the oscilloscope at a frequency above a predetermined minimum value. When the frequency of the triggering signal from the external source 14 falls below a first predetermined value (determined primarily by the RC time constant of the combination of resistor 27 and capacitor 17), the local, phase-delayed source is activated to supply a triggering signal of adequate frequency to the oscilloscope 12.

Figure 2:
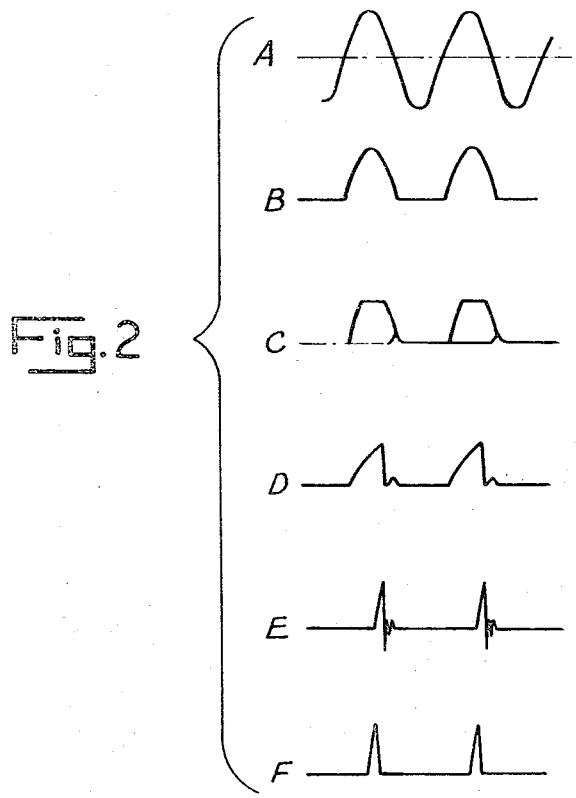
FIG. 2 comprises a series of waveforms appearing at various points within the circuit of FIG. 1 and illustrating the operation of that circuit.

The waveforms shown on lines A through F of FIG. 2 further illustrate the operation of the circuitry of FIG. 1. The reference letters appearing in FIG. 1 are used to designate that point at which the correspondingly lettered waveform of FIG. 2 appears.

It is to be understood that the embodiment which has been described is merely illustrative of one application of the principles of the invention. Numerous modifications could be made without departing from the true spirit and scope of the invention.

What is claimed is:

1. A circuit arrangement for automatically supplying periodic input signals to a utilization circuit whenever a primary source of such periodic signals is disabled, said arrangement comprising in combination, a secondary source of said input signals, first means for detecting the absence of signals from said primary source, a semiconductor device comprising a first terminal, a second terminal, and a third terminal, said semiconductor device being constructed so that the impedance normally present between the first terminal and the third terminal is reduced when the voltage between the first terminal and the second terminal reaches a predetermined value so that a substantial current flow is enabled between the first terminal and the third terminal, a capacitor connected in series relation with a charging circuit, second means connected between said first means and said charging circuit to charge said capacitor to a voltage having the predetermined value in the absence of signals from said primary source, an output circuit connected in series with the third terminal of the semiconductor device, third means for applying said input signals from the secondary source to the second terminal of the semiconductor device, and circuit means for connecting the first terminal of the semiconductor device to said capacitor so that the capacitor is discharged when the voltage between the first and second terminals reaches the predetermined value as input signals are applied from the secondary source to the second terminal of the semiconductor device.

2. Apparatus as set forth in claim 1 wherein said utilization circuit is the synchronizing circuit in a cathode-ray oscilloscope.

3. A circuit arrangement for automatically supplying periodic signals to a utilization circuit whenever the primary source of said such signals is disabled, said arrangement comprising, in combination, a secondary source of said signals, a capacitor, a resistive circuit path connecting said capacitor to a unidirectional voltage source such that said capacitor is charged at a predetermined rate thereby, a controlled rectifier having a transconductive path and a gate electrode, said gate electrode being connected to said primary source of periodic signals such that said transconductive path is rendered conductive periodically by signals from said primary source, means for connecting said transconductive path to discharge said capacitor whenever said transconductive path is rendered conductive whereby the capacitor is maintained in a substantially discharged condition, and switching means responsive to any voltage across said capacitor exceeding a predetermined value for applying signals from said secondary source to said utilization circuit, said switching means comprising a unijunction transistor having an emitter current path and an interbase current path, a second capacitor connected in series with a resistive charging circuit, an output circuit, means serially connecting said output circuit, said interbase path of said unijunction transistor, and said secondary source, and circuit means connecting said emitter current path of said unijunction transistor to discharge said second capacitor when the voltage across said second capacitor exceeds a predetermined value as a result of charge accumulation while a signal is applied to said interbase path from said secondary signal source.

4. In combination with a cathode-ray oscilloscope having a synchronizing signal input, apparatus for automatically applying a synchronizing signal to said input whenever synchronizing signals from an external source are not applied to said synchronizing signal input which comprises, in combination, a local signal generator, a charge-accumulating capacitor connected through a resistive circuit path to a voltage source, semiconductor switching means for periodically discharging said accumulating capacitor whenever a signal from said external source appears, and a threshold device responsive to the accumulated voltage across said capacitor for applying signals to said synchronizing input from said local generator, said threshold device comprising a unijunction transistor having an emitter and an interbase current path and characterized in that said interbase current path becomes conductive when the voltage applied to said electrode exceeds a specified fraction of the voltage applied across said interbase current path, a second capacitor, means for charging said second capacitor at a variable rate, means for applying the voltage across said second capacitor to said interbase current path, and means including said interbase current path for connecting said local signal generator to said synchronizing signal input.